June 2, 1942.    A. RAPPL ET AL    2,284,966
WINDSHIELD CLEANER
Filed Oct. 17, 1939    2 Sheets-Sheet 1
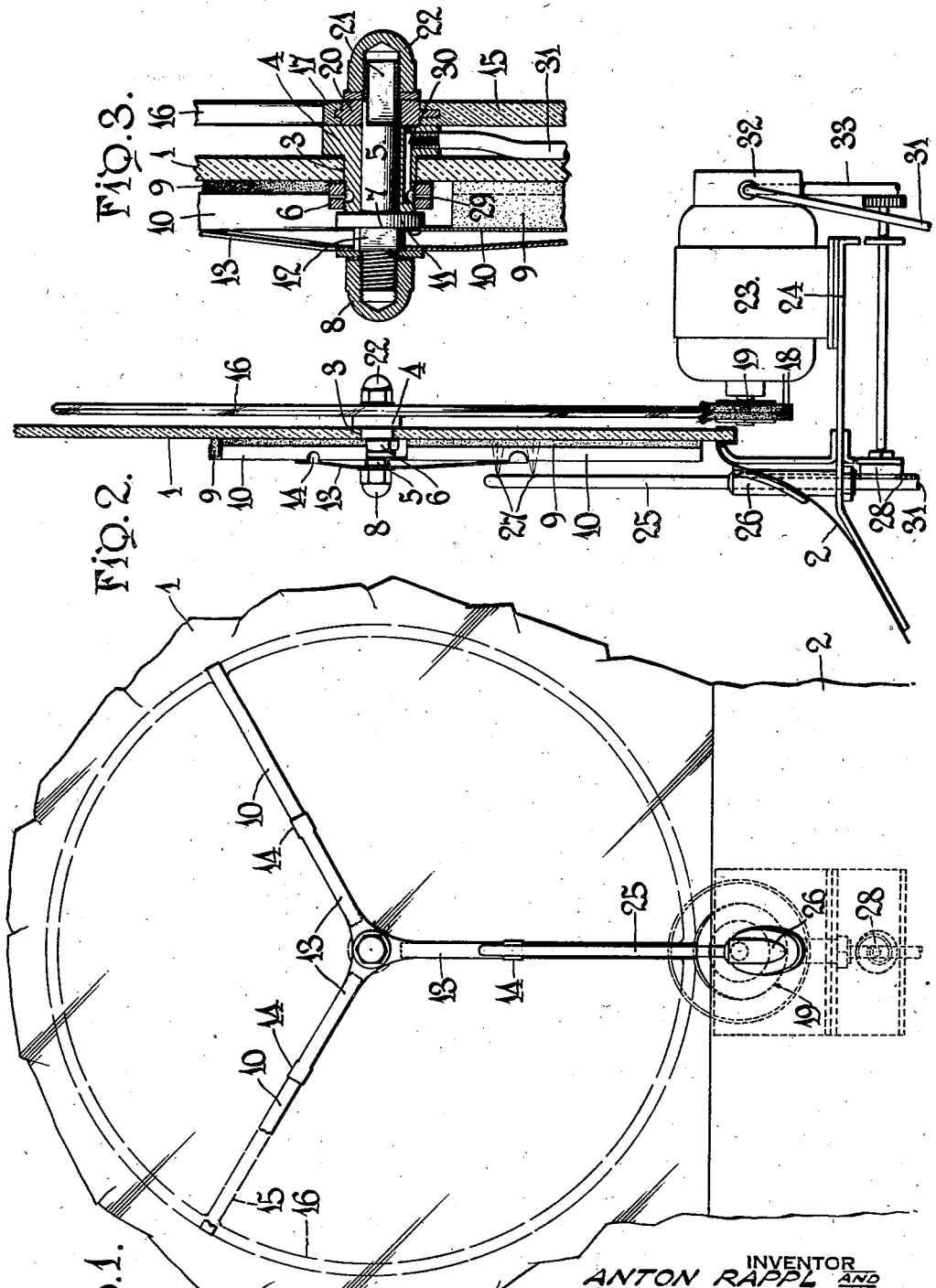
INVENTOR
ANTON RAPPL AND
DONALD N. MUSSEN
BY
Beau, Brooks, Buckley & Beau.
ATTORNEYS

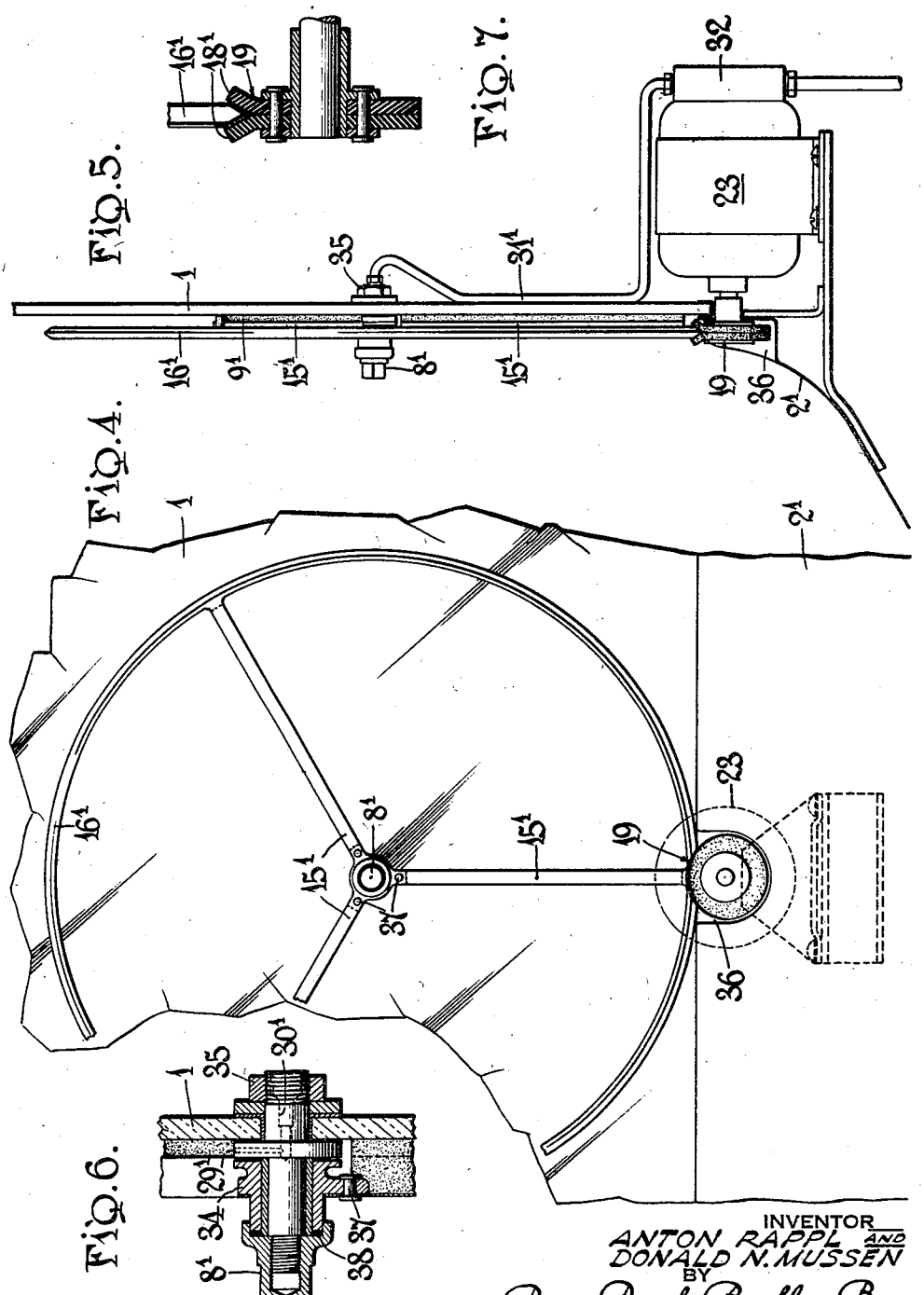

Patented June 2, 1942

2,284,966

UNITED STATES PATENT OFFICE 2,284,966

WINDSHIELD CLEANER

Anton Rappl, Buffalo, and Donald N. Mussen, Williamsville, N. Y., assignors to Trico Products Corporation, Buffalo, N. Y.

Application October 17, 1939, Serial No. 299,854

9 Claims. (Cl. 15—250)

This invention relates to a cleaner for the windows and windshields of motor vehicles and more particularly it is designed to provide a window cleaning mechanism for airplanes in which the high speed of flight necessitates a change from the conventional style of mechanism utilized on road vehicles.

The primary object is to provide a cleaner mechanism which will function efficiently under the varying weather and climatic conditions encountered during a flight. More particularly the invention comprehends the use of a mechanism and construction by which interference with the pilot's vision is kept to a minimum. Further, the invention has for its object to provide an efficient cleaner mechanism by which the accumulation of ice and other vision-obscuring matter may be effectively removed in a practical manner.

In the drawings

Fig. 1 is a fragmentary illustration of a motor vehicle or airplane window equipped with a cleaner embodying the present invention;

Fig. 2 is a vertical section showing more clearly the mounting of the cleaner;

Fig. 3 is a fragmentary enlarged sectional view through the hub or central portion of the cleaner, slightly modified as to the manner of applying the cleaning fluid;

Fig. 4 is a view similar to Fig. 1 but showing a further modified embodiment of the invention;

Fig. 5 is a side elevation of the modification of Fig. 4;

Fig. 6 is a view similar to Fig. 3 through the hub portion of the further modification; and Fig. 7 is a sectional view illustrating more clearly the mode of driving the wiper means.

Referring more particularly to the drawings, numeral 1 designates the window or windshield of an airplane framed by the cowl structure 2. Mounted within an opening 3 in the window glass is a fitting 4 providing a bearing or journal support for the wiper actuating shaft 5. This bearing may be suitably clamped in position by the nut 6, and the shaft may have its forward end formed with a shoulder 7 against which a cap nut 8 threaded on the extremity of the shaft will serve to secure the wiper means.

The wiper means comprises one or more squeegees or wiping blades 9 having their wiping strips embraced by channeled holders 10 which radiate from a central hub part 11. The hub fits an enlarged shaft portion 12 of irregular shape, having a flat side to key the hub thereto while permitting axial freedom of movement. In the present disclosure three wipers are shown with their channeled holders or back members radiating from the hub 11. The desired pressure for the wiping contact is furnished by a tri-armed spring pressure device 13, each of the arms having a pair of ears 14 straddling the respective wiper for holding the parts of the assembly in proper relation. By this arrangement the spring force will be applied to each blade between the ends thereof and substantially midway of its length.

Means are provided for imparting rotary movement to the shaft 5, and in order to maintain the field of vision as clear as possible, the actuating means are primarily disposed without the path of the wiping means. In the form of the invention depicted in Fig. 1, the power is transmitted to the shaft through a transparent member shown herein as a wheel having radiating spokes 15, which are preferably in registry with the wipers 9 and join the rim 16 to the hub 17. The transparent material may be glass or some transparent plastic such as Lucite, and the wheel may be cut from a single sheet of the transparent stock material or otherwise fabricated so as to permit vision through those portions of the wheel which fall within the field of vision. The rim of the wheel may have its peripheral edge slightly beveled, if desired, so as to more easily enter between the friction flanges 18 of the driving wheel 19 and, further, to provide a better frictional driving contact. The transparent hub 17 may be suitably keyed or secured to a metal sleeve or ring 20 which has an opening to conformably fit the flat face 21 of the shaft for securing a driving connection therewith. A cap nut 22 secures the driven or wiper actuating wheel in position on the shaft to rotate therewith as a unit on the fixed bearing support 4.

The driving wheel 19 is operated by any suitable means, such as an electric motor 23, suitably supported on a bracket 24 beneath the cowl 2. As the motor is operated at a high speed the wheel rim 16 will revolve at a comparatively slower speed but preferably at a speed of several revolutions per second so that the wipers 9 will maintain the glass clear of vision-obscuring matter. The moisture removed from the glass will obviously be thrown by centrifugal force clear of the field of vision, and by reason of the transparent actuating wheel and the excessive speed of operation of the wipers, the window area will be maintained practically clear during inclement weather.

Means are provided for disposing in the path of the wipers some suitable cleaning fluid by which congealed or other vision-obscuring matter may be softened to facilitate its removal. This fluid may be discharged upon the window glass by means of a spray pipe 25 slidably mounted in a bearing 26 in the cowl for retraction from the field of vision when the wipers are not in use. This pipe, when projected, will be disposed forwardly of the path of the wipers and may be provided with one or more openings 27 for the discharge of the cleaning fluid onto the glass. Any suitable means may be provided for retracting the spray pipe, such as the rack and worm pinion arrangement indicated by the numeral 28. This fluid may also be supplied through radial ports 29 in the clamping nut 6 on the fixed support 4 (Fig. 3), such radial ports being in communication with a duct 30 which is supplied with the fluid by a pipe 31. The fluid may be forced through the discharge ports 27 or 29 by means of a pump 32 conveniently driven by the electric motor 23 and having its inlet 33 leading to a reservoir not shown.

In the modification shown in Figs. 4, 5, 6 and 7, the wiper actuating wheel is disposed exteriorly of the window glass 1 and is conveniently formed of sheet metal, the rim 16' being shaped with a V-channel, as shown in Fig. 7, to provide the beveled periphery. The wipers 9' in this embodiment are directly carried by the spokes 15' which latter are connected to a rotatable hub 34 by the rivets 37. The hub is slidable on the shaft under the urge of a spring washer 38 beneath the hub cap 8'. The end of the shaft protruding from the inner side of the window glass is held in place by a nut 35, and is suitably provided with a fluid duct 30'. The cleaning fluid delivered by the pump 32 through the pipe 31' will pass through the duct 30' and discharge through the radial orifice 29'. The pump is operated by the motor 23 as in the earlier described modifications. The driving wheel 19 which is fixed on the motor shaft, as in the former instance, is disposed within a forwardly facing recess or pocket 36 in the cowl 2' for driving contact with the wheel rim 16'. In this construction the transmisison of power to the wipers is more direct but the large actuating wheel having a lightly designed spoke formation permits practically uninterrupted vision.

In both forms of the invention the primary operating mechanism, comprising the motor and the driving wheel, is disposed without the field of vision because of the large actuating wheel, the diameter of which is substantially as great as that of the path of the wipers, and such field is maintained practically clear by reason of the thin or transparent spoked formation of this large wheel which is rotated at a high velocity.

While the structure has been described with great detail, it is obvious that the inventive principles here involved may assume other physical embodiments without departing from the spirit or scope of the invention claimed.

What is claimed is:

1. A window cleaner for motor vehicles of the airplane type, comprising a rotary shaft with means for journaling it, wiper means fixed on the shaft to be moved thereby in a path over the exterior glass surface, a spoked wheel also fixed on the shaft for imparting rotary movement to the same, and means for driving the wheel at its periphery, the diameter of the wheel being substantially as great as that of the path of movement of the wiper means, whereby the driving means is wholly removed from the cleaned field of vision as defined by the spoke area.

2. A window cleaner comprising a rotary shaft with means providing journal support for the same, wiper means operatively connected to the shaft to be moved thereby in a rotary path over the window surface, a wheel fixed on the shaft for rotating the same, and means acting on the peripheral portion of the wheel for rotating the latter, the diameter of the wheel being substantially equal to that of the path of movement of the wiper means, with that portion of the wheel between the shaft and the circumference of the path being transparent to permit vision therethrough.

3. A window cleaner comprising a rotary shaft with means providing journal support for the same, wiper means operatively connected to the shaft to be moved thereby in a rotary path over the window surface, a wheel fixed on the shaft for rotating the same, and a rotatable driving member journaled outside the path of the wiper means and acting on the peripheral portion of the wheel for rotating the latter, the diameter of the wheel being at least substantially as great as that of the path of movement of the wiper means, the wheel having spokes and the wiper means being disposed substantially in registry with the spokes.

4. A window cleaner for motor vehicles comprising a rotary shaft with means for journaling it, wiper means fixed on the shaft to be moved thereby in a circular path over the exterior glass surface, a wheel also fixed on the shaft for imparting rotary movement to the same, and means for driving the wheel at its periphery, the periphery of the wheel being substantially smooth and the driving means including a friction wheel having flexible flanges frictionally embracing the periphery of the first wheel at the point of driving contact whereby the wiper means may slip upon encountering abnormal resistance.

5. A window cleaner for motor vehicles comprising a rotary shaft with means for journaling it, wiper means fixed on the shaft to be moved thereby in a path over the exterior glass surface, a wheel also fixed on the shaft imparting rotary movement to the same, means for driving the wheel at its periphery, the diameter of the wheel being substantially as large as that of the path of movement of the wiper means, whereby the driving means is removed from the cleaned field of vision, and means for feeding a cleaning fluid to the window surface in the path of the wiper means, said feeding means including a retractable delivery pipe adjustably arranged to discharge the fluid at radially selective points in the path of the wiper means, and manual control means for adjustably retracting and projecting the pipe from and into the field of vision.

6. A window cleaner comprising a rotary shaft with means engageable in an opening in the window glass for providing journal support for the shaft whereby the field of vision through the surrounding glass is unobstructed, wiper means operatively connected to the shaft to be moved thereby in a rotary path over the surrounding window surface, a wheel fixed on the shaft for rotating the same, and means mounted radially outward from the path of the wiper means and acting on the peripheral portion of the wheel for rotating the latter, the diameter of the peripheral portion being at least substantially as great as that of the path of movement of the wiper means whereby the field of vision is interrupted solely by the wiper means.

7. A window cleaner for motor vehicles comprising a rotary shaft with means for journalling it in an opening in the window glass to be supported thereby so that the surrounding field of vision is unobstructed, wiper means fixed on the shaft to be moved thereby in a path over the exterior glass surface to provide the field of vision, a wheel also fixed on the shaft imparting rotary movement to the same, and means outside the field of vision for driving the wheel, the diameter of the wheel being substantially as large as that of the path of movement of the wiper means with the periphery of the wheel being operatively engaged by the driving means whereby the driving means is removed from the cleaned field of vision, and means normally retracted from the field of vision and projectable thereinto for feeding a cleaning fluid into the path of the wiper means, the field of vision being normally obstructed solely by the wiper means.

8. A window cleaner comprising a rotary shaft with means providing journal support for the same, wiper means operatively connected to the shaft to be moved thereby in a rotary path over the window surface, a transparent wheel coaxial with the shaft and operatively connected thereto for rotating the same, said transparent wheel having a peripheral portion of a diameter at least substantially as great as that of the path of movement of the wiper means so as to bring the peripheral portion without the field of vision cleaned by the wiper means, and a drive for the wheel journaled radially outward from the path of said wiper means and operatively engaging the peripheral portion of the transparent wheel whereby the field of vision is uninterrupted by said drive, the field of vision cleaned by said wiper means lying between the shaft and the peripheral portion of the wheel and being traversed by the transparent portion of the wheel whereby the field of vision is uninterrupted by the transmission of power from the drive to the wiper means.

9. A window cleaner comprising a rotary shaft with means providing journal support for the same, wiper means operatively connected to the shaft to be moved thereby in a rotary path over a window surface to clean a field of vision surrounding the shaft, a wheel fixed on the shaft for rotating the same and having a diameter at least substantially as great as the path of movement of the wiper means whereby the peripheral portion of the wheel is disposed without the field of vision, the portion of the wheel between its periphery and the shaft being such as to permit vision therethrough, and a rotatable driving member journaled radially outward from the periphery of the wheel and operatively engaging the periphery outside of the field of vision whereby the transmission of power from the drive member to the shaft is across the field of vision in a manner to unobstruct vision through the field.

ANTON RAPPL.
DONALD N. MUSSEN.